United States Patent
Spaulding et al.

(10) Patent No.: US 10,176,341 B2
(45) Date of Patent: Jan. 8, 2019

(54) SYSTEMS AND METHODS FOR PROVIDING DATA RESIDENCY PROTECTION USING REMOTE PROXIES

(71) Applicant: ORACLE INTERNATIONAL CORPORATION, Redwood Shores, CA (US)

(72) Inventors: Kent Arthur Spaulding, Portland, OR (US); Kenneth Joseph Meltsner, Portland, OR (US); Reza B'Far, Irvine, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 305 days.

(21) Appl. No.: 15/073,700

(22) Filed: Mar. 18, 2016

(65) Prior Publication Data

US 2017/0270317 A1    Sep. 21, 2017

(51) Int. Cl.
*G06F 21/00* (2013.01)
*H04L 29/06* (2006.01)
(Continued)

(52) U.S. Cl.
CPC ...... *G06F 21/6254* (2013.01); *H04L 63/0209* (2013.01); *H04L 63/0281* (2013.01); *H04L 67/06* (2013.01); *H04W 12/02* (2013.01)

(58) Field of Classification Search
CPC .............. G06F 21/6254; H04W 12/02; H04L 63/0209; H04L 63/0281; H04L 67/06
See application file for complete search history.

(56) References Cited

U.S. PATENT DOCUMENTS

| 9,021,135 | B2 * | 4/2015 | Ang | H04L 61/2596 380/30 |
| 2013/0091350 | A1 * | 4/2013 | Gluck | H04L 63/0281 713/153 |
| 2016/0034442 | A1 | 2/2016 | Levy et al. | |

FOREIGN PATENT DOCUMENTS

| WO | WO-0029964 A1 * | 5/2000 | ......... G06F 17/2735 |
| WO | 2014145777 A1 | 9/2014 | |

OTHER PUBLICATIONS

Yueiqiang Cheng, Xuhua Ding, Robert H. Deng; "Efficient Virtualization-Based Application Protection Against Untrusted Operating System"; Apr. 2015; ASIA CCS '15: Proceedings of the 10th ACM Symposium on Information, Computer and Communications Security; Publisher: ACM; pp. 345-356 (Year: 2015).*

(Continued)

*Primary Examiner* — David Garcia Cervetti
*Assistant Examiner* — Courtney D Fields
(74) *Attorney, Agent, or Firm* — Kraguljac Law Group, LLC

(57) ABSTRACT

Computerized embodiments are disclosed for keeping personally identifying information within a protected domain environment when interacting with a computerized service environment. In one embodiment, user interface commands are received from a remote computerized system of the protected domain environment at the computerized service environment via computerized network communications. A data residency protection component is generated within the computerized service environment in response to the user interface commands. The data residency protection component is configured to act as a proxy for the computerized service environment, when executed in the protected domain environment by the remote computerized system, to isolate personally identifying information from visibility or storage outside of the protected domain environment. The data (Continued)

residency protection component is downloaded to the remote computerized system of the protected domain environment from the computerized service environment via the computerized network communications.

16 Claims, 4 Drawing Sheets

(51) Int. Cl.
    *G06F 21/62*     (2013.01)
    *H04L 29/08*     (2006.01)
    *H04W 12/02*     (2009.01)
    *G06F 21/33*     (2013.01)
    *G06F 15/00*     (2006.01)

(56) References Cited

OTHER PUBLICATIONS

Perspecsys Announces Cloud Security Patent and New Cloud Data Control Platform Capabilities; pp. 1-4; downloaded on May 23, 2016 from http://perspecsys.com/article/perspecsys-announces-cloud-security-patent/; Perspecsys.

Patent Cooperation Treaty (PCT) International Search Report and Written Opinion in co-pending PCT International Appl. No. PCT/US2017/022621 (International Filing Date of Mar. 16, 2017) dated May 18, 2017 (12 pgs.).

\* cited by examiner

SYSTEMS AND METHODS FOR PROVIDING DATA RESIDENCY PROTECTION USING REMOTE PROXIES

BACKGROUND

Cloud-computing services and Software as a Service (SaaS) providers are becoming more and more ubiquitous. Clients or customers that take advantage of such services are often concerned about how and where their computerized data is being handled and protected. Some jurisdictions in the world have data residency (DR) requirements (regulations) defining which kinds of data cannot leave that jurisdiction. For example, in some countries, personally identifying information (PII) about citizens can only be stored within the borders of that country.

Such regulations have been addressed by Internet applications most commonly by "safe harbor" laws that define exceptions to the data residency requirements. However, such "safe harbor" laws are under attack. Some application providers can deploy their offerings to data centers sited within the jurisdiction. The industry also offers data residency products that are standalone applications customized to work for a given application sited outside of the jurisdiction.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one embodiment of the boundaries. In some embodiments one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed that allow a service provider to offer a data residency service that a local administrator of a protected domain environment can use to configure and then download an executable data residency protection component. The data residency protection component, when executed in the protected domain environment of the local administrator, isolates personally identifying information (PII) or other data deemed sensitive, and prevents its visibility outside of the protected domain environment. As a result, users in the protected domain environment can access applications provided by the service provider while not allowing personally identifying information (PII), or other data the administrator declares to be sensitive, to leave the protected domain environment.

The following terms are used herein with respect to various embodiments.

The term "personally identifying information (PII)", as used herein, refers to computerized data that could potentially identify a specific individual, or data that can be used to distinguish one person from another and can be used to remove the anonymity of anonymous data. It can also refer to other information attributable to a specific individual that may be deemed sensitive or confidential even when this is not strictly required by regulations within a given jurisdiction.

The term "data residency", as used herein, refers to the physical location of an organization's data or information as embodied in any sort of physical storage device or media. The term may also refer to the legal or regulatory requirements imposed on data based on the country or region in which the data resides.

The term "computerized service environment", as used herein, refers to a computerized system that offers application services which can be accessed remotely over the Internet or a private network, including both wired and wireless connections.

The term "protected domain environment", as used herein, refers to a country or region that imposes legal or regulatory data residency requirements, and/or computerized systems within the country or region.

The term "data residency protection component", as used herein, refers to one or more digital files (e.g., an executable file) that acts as a proxy or access point for a computerized service environment, when executed in a protected domain environment, to isolate personally identifying information from visibility outside of the protected domain environment. The term "proxy" is sometimes used herein to mean a data residency protection component that provides access to an external service environment using a protocol intended for proxied or relayed communications between a user local to the protected domain environment and a service environment located outside of that domain environment.

Figure 1:
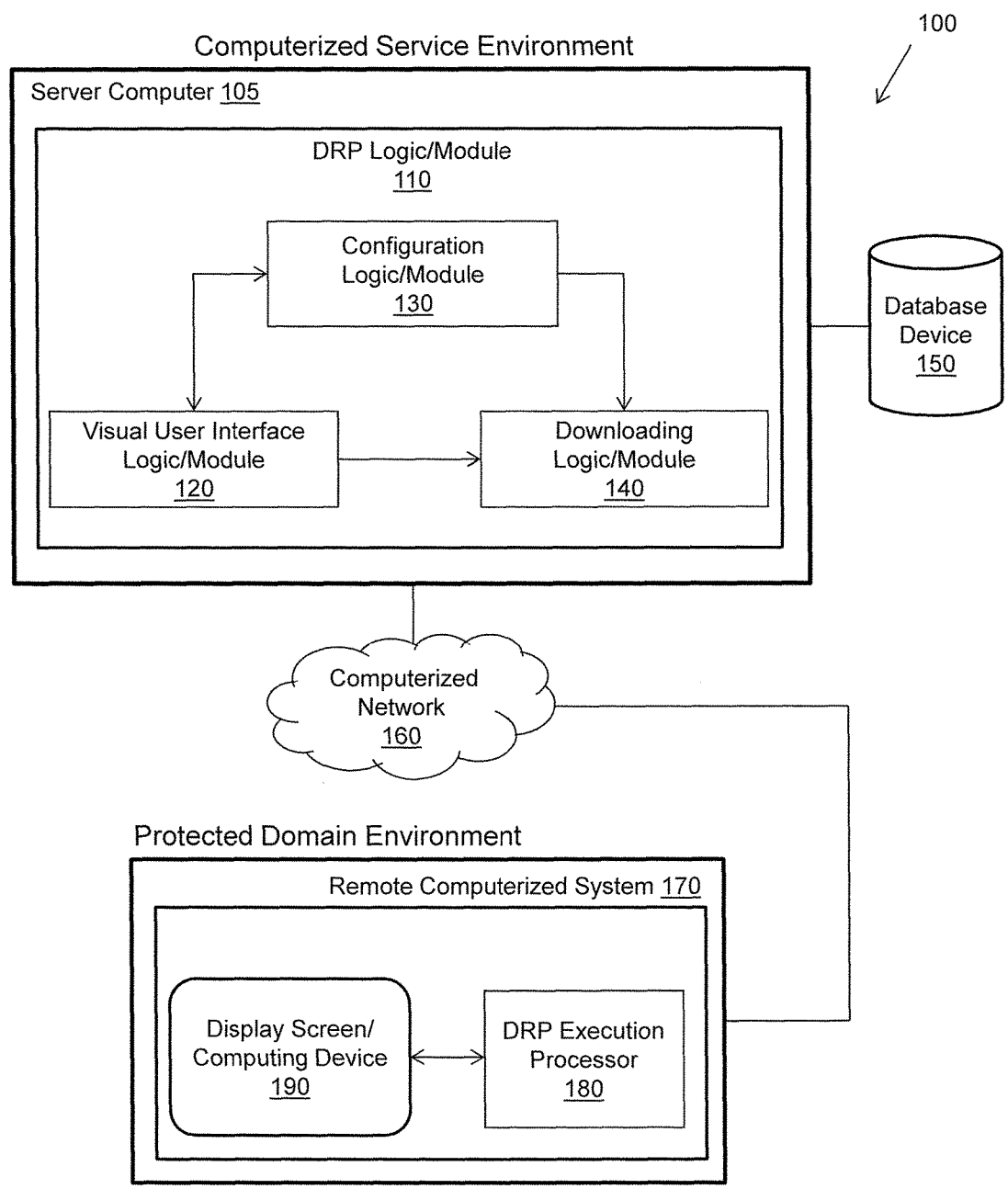
FIG. 1 illustrates one embodiment of a computer system having a computing device configured with data residency protection logic.

FIG. 1 illustrates one embodiment of a centralized computer system 100 having a computing device 105 configured with data residency protection (DRP) logic 110. In one embodiment, the computing device 105 is a server computer in a computerized service environment (e.g., a SaaS (Software as a Service) environment). In one embodiment, data residency protection logic 110 is part of a larger computer application (e.g., a cloud computing DRP application), configured to allow remote users to protect personally identifying information (PII). Data residency protection logic 110 is configured to computerize and automate the process of generating and updating executable and downloadable data residency protection components in a computerized service environment (e.g., a computerized cloud service environment).

With reference to FIG. 1, in one embodiment, data residency protection logic 110 is implemented on the computing device 105 and includes logics or modules for implementing various functional aspects of data residency protection logic 110. Data residency protection logic 110 allows remote users (remote from the service environment) to configure protection for their protected domain environments. In one embodiment, data residency protection logic 110 includes visual user interface logic/module 120, configuration logic/module 130, and downloading logic/module 140 which are discussed in more detail later herein.

In one embodiment, the computer system 100 includes a database device 150 which is operably connected to the computing device 105. The computer system 100 serves as a computing/data processing system that includes an application or collection of distributed applications for enterprise organizations. The applications and computer system 100 may be configured to operate with or be implemented as a cloud-based networking system, a Software as a Service (SaaS) architecture, or other type of distributed computing solution.

As shown in FIG. 1, in one embodiment, computing device 105 is a server computer in a computerized service environment configured to communicate with, via a computerized network 160 (e.g., the internet), a remote computerized system 170 in a protected domain environment which is physically remote from the computerized service environment. The remote computerized system 170 includes a data residency protection (DRP) execution processor 180 configured to execute a data residency protection component downloaded from the computing device 105. The remote computerized system 170 also includes a display screen/computing device 190.

In one embodiment, users of the remote computerized system 170 in the protected domain environment can access the server computer 105 in the computerized service environment via the computerized network 160. Users may access the server computer 105 to use applications provided by the computerized service environment. The applications may be, for example, accounting applications, financial applications, engineering applications, or any other type of application that is more practical for a user to access from a network-accessible environment physically located outside of the protected domain instead of having the application installed and operating on a system within the protected domain environment. A system administrator of the remote computerized system 170 can access the server computer 105, having the data residency protection logic 110, to configure a data residency protection component or proxy within the computerized service environment, in accordance with one embodiment.

Referring back to the logics of data residency protection logic 110 of FIG. 1, in one embodiment, visual user interface logic 120 is configured to generate a graphical user interface (GUI) to facilitate user interaction with data residency protection logic 110. For example, visual user interface logic 120 includes program code that generates the graphical user interface and allows the graphical user interface to be accessed and displayed (e.g., on display screen/computing device 190) by the remote computerized system 170. In response to user actions and selections via the GUI, associated aspects of configuring a data residency protection component may be manipulated.

For example, in one embodiment, visual user interface logic 120 is configured to provide a graphical user interface that allows a system administrator of the remote computerized system 170 of the protected domain environment to make selections and enter data (e.g., in a template) associated with configuring a data residency protection component. In one embodiment, the selections and data are provided to visual user interface logic 120 from the remote computerized system 170 in the form of user interface commands or configuration commands. Templates for making selections and entering data are stored in the database device 150 which is operably connected to the server computer 105 in the computerized service environment. Furthermore, a resulting data residency protection component can be stored in the database device 150 as discussed later herein.

Referring again to FIG. 1, in one embodiment, configuration logic 130 is configured to generate a data residency protection component within the computerized service environment. The data residency protection component is generated in response to configuration commands (e.g., response commands generated by a system administrator) received from the remote computerized system 170 of the protected domain environment via the computerized network 160 as facilitated by the graphical user interface.

The data residency protection component is configured to act as a proxy for the application in the computerized service environment. That is, when executed in the protected domain environment, the data residency protection component isolates personally identifying information (PII) from being visible outside of the protected domain environment. In accordance with one embodiment, the data residency protection component includes at least an executable digital file (e.g., a Java executable component or another remotely-created, executable format) that is downloaded to the protected domain environment and operates within that environment. The data residency protection component can be configured to be compatible with a web-based protocol, a mail transfer protocol (e.g., for email), a file transfer protocol (e.g., for transferring electronic files), or some other protocol, in accordance with various embodiments.

Generally, a data residency protection component protects personally identifying information and other data that is deemed to be sensitive. Additionally, in one embodiment, a data residency protection component resides on the network of the client or customer and can only be accessed via that network (i.e., users of the service application have to go through the proxy) such that no protected data leaves the company's network.

As an example, a system administrator (or an integration specialist) of the remote computerized system 170 may access a template from the database device 150 via the graphical user interface provided by visual user interface logic 120. The template may correspond to data residency regulations for the protected domain environment. The system administrator can proceed to make selections from the template, fill in data fields of the template, and make system-related choices. For example, the selections may be based on specific interpretations of the data residency regulations. The data fields may be filled in with data to, for example, identify the types of data that are to be protected. A system-related choice can be made to specify where the data residency protection component is to be installed and on which operating system. Another system-related choice can be made to specify a protocol with which the data residency protection component is to be compatible. Then, in one embodiment, configuration logic 130 operates on the information in the template to generate a data residency protection component (e.g., an executable file or a set of packaged files) for the protected domain environment.

Other data residency protection components may be generated within the computerized service environment for other protected domain environments. The computerized service environment is knowledgeable about all components it has generated for protected domains. In one embodiment, configuration logic 130 is also configured to ensure that a new data residency protection component, when generated, does not counteract data residency protection provided by other data residency protection components previously generated for other protected domain environments. By being knowledgeable of the protecting configurations of the other proxies for other protected domain environments, configuration logic 130 can make sure that generation of a new data residency protection component (a new proxy) will not compromise data residency protection for the other protected domain environments.

For example, a range of token values can be assigned for each data residency protection component (proxy). The token values are used as substitutes for PII values to keep PII information within the protected domain environment. In a simple case, to limit token length to 4 bytes (32 bits), tokens can range in value from 0 to $2^{30}-1$ for each proxy (roughly 1 billion tokens per system). Then, each proxy can have a prefix of either 0, 1, 2, or 3 (e.g., if no more than 4 proxies are expected). In practice, longer tokens may be used to allow for more proxies as well as to limit values within the token to valid Unicode characters.

Otherwise, there could be tokens with the same value that correspond to different clear text values. This can damage the data stored at the central application instance. For example, a human resource record for a French employee could end up being linked to data for a Thai employee, as well as leading to incorrect substitutions for token values depending on which proxy server was operating on the tokenized, protected data.

Each proxy produces tokens in a given range or a given prefix, and the ranges/prefixes do not overlap. Since the proxies are configured in the computerized service environment, the computerized service environment is knowledgeable about all of the proxies and assigns the ranges, or prefixes (or both.) The system may also suggest rational choices for prefixes and/or ranges. The set of resulting proxies are elements of a system for data residency. In contrast, with third party products for DRP, each proxy is created in isolation allowing system administrators to make mistakes.

A central configuration also allows control of which network addresses are allowed to use a given data residency proxy to ensure that someone from outside a given country cannot connect to that country's proxy server and retrieve the protected information for that country. A central configuration also allows a proxy to be configured to respond only to certain Internet Protocol (IP) ranges, thereby adding another layer of protection. With manual configuration, dependence is on local system administrators to set up such protections manually and correctly, and to not accidentally (or maliciously) violate the data residency rules. Centralized, automated assignment of token ranges, in combination with the ability to lock those assigned ranges against administrator modification, should significantly reduce the chances that protected information will leave a given country or region (protected domain environment).

In one embodiment, downloading logic 140 is configured to download the data residency protection component to the remote computerized system 170 of the protected domain environment from the computerized service environment via the computerized network 160. The data residency protection component is downloaded by downloading logic 140 in response to a download command received from the remote computerized system 170 via the computerized network 160 as facilitated by the graphical user interface provided by visual user interface logic 120. For example, in one embodiment, once the data residency protection component (e.g., an executable file) is generated by configuration logic 130, the system administrator can select an icon on the graphical user interface instructing downloading logic 140 to download the component.

In accordance with one embodiment, the data residency protection component is automatically installed on the remote computerized system 170 in the protected domain environment upon being downloaded. In one embodiment, visual user interface logic 120 provides a selectable option, via the graphical user interface, for the data residency protection component to be automatically installed upon being downloaded. Alternatively, the data residency protection component may be installed manually by a system administrator, for example.

Even though the data residency protection component gets downloaded to the remote computerized system 170 of the protected domain environment, a copy of the data residency protection component is stored in the database device 150 in the computerized service environment, in accordance with one embodiment. Changes in service application configurations of the computerized service environment may occur over time, resulting in incompatibilities between the computerized service environment and a data residency protection component. In one embodiment, configuration logic 130 is configured to update the data residency protection component in the computerized service environment in response to changes in the service application configurations to maintain compatibility.

Furthermore, in one embodiment, downloading logic 140 is configured to download the data residency protection component, as updated, to the remote computerized system 170 of the protected domain environment via the computerized network 160. The updated component may be automatically or manually installed on the remote computerized system 170, in accordance with various embodiments, after being downloaded. In this way, the computerized service environment maintains existing data residency protection components across multiple protected domain environments as application configurations change. For example, in one embodiment, after having been downloaded and installed, a data residency protection component can periodically consult a SaaS application of the computerized service environment for configuration updates.

Other embodiments may provide different logics or combinations of logics that provide the same or similar functionality as data residency protection logic 110 of FIG. 1. In one embodiment, data residency protection logic 110 is an executable application including algorithms and/or program modules configured to perform the functions of the logics. The application is stored in a non-transitory computer storage medium. That is, in one embodiment, the logics of data residency protection logic 110 are implemented as modules of instructions stored on a computer-readable medium.

In one embodiment, the computer system 100 is a centralized server-side application that provides at least the functions disclosed herein and that is accessed by many users via computing devices/terminals (e.g., display screen/computing device 190) communicating with the computer system 100 (functioning as the server) over a computer network. Other embodiments may provide different computers and logics or combinations of computers and logics that provide the same or similar functionality as the system 100 of FIG. 1.

In this manner, data residency protection logic 110 allows remote system administrators in a protected domain environment to configure protection for their personally identifying information (PII) within a computerized service environment which is outside the protected domain environment. However, the protection is executed within the protected domain environment.

Figure 2:
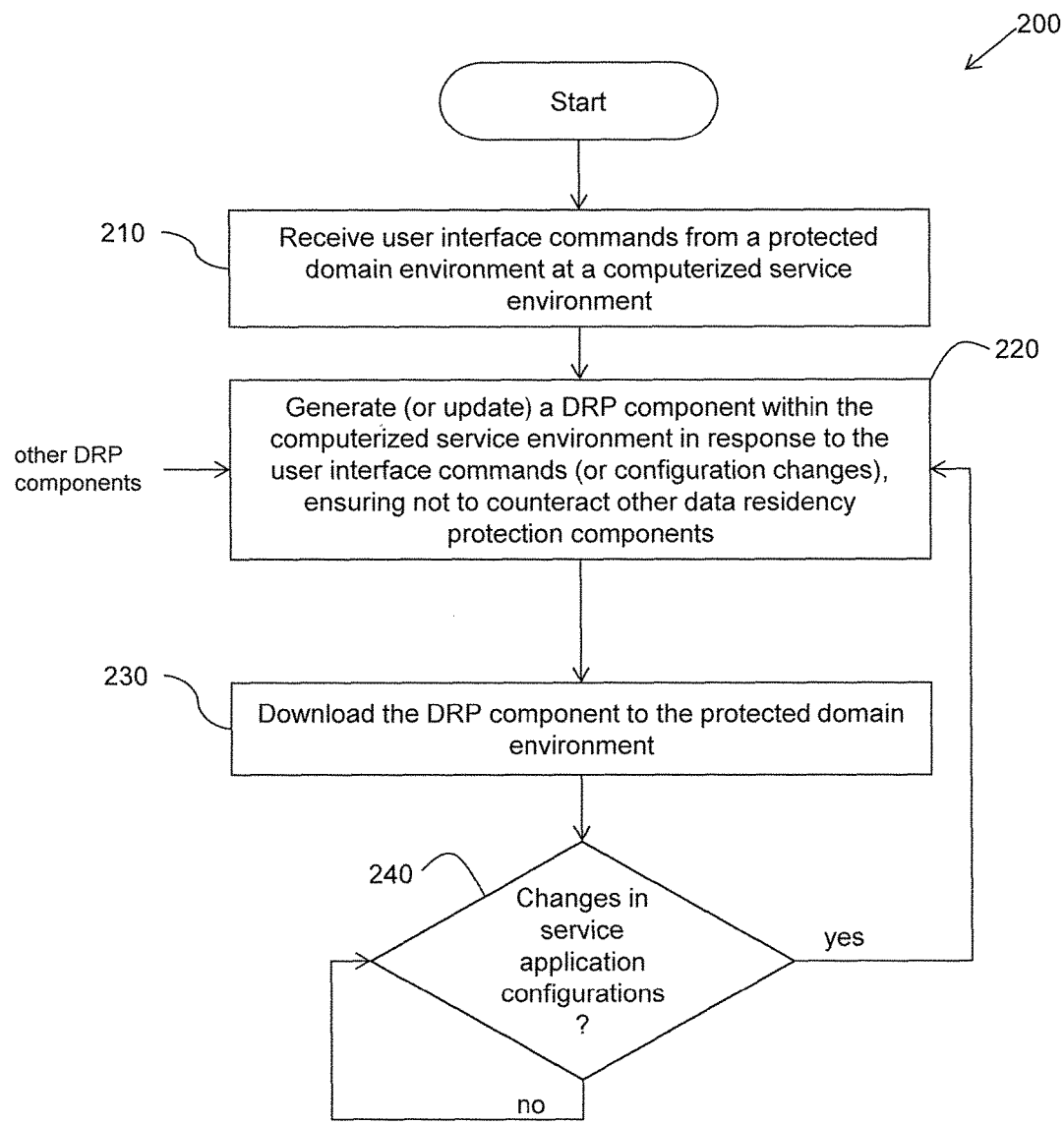
FIG. 2 illustrates one embodiment of a method which can be performed by data residency protection logic of FIG. 1 to generate a data residency protection component (a proxy)

FIG. 2 illustrates one embodiment of a method 200 which can be performed by data residency protection logic 110 of FIG. 1 to generate a data residency protection component. Method 200 describes operations of the system 100 of FIG.

1 and is implemented to be performed by the system 100 of FIG. 1, or by a computing system configured with an algorithm of the method 200. For example, in one embodiment, method 200 is implemented by a computing system configured to execute a computer application. The computer application is configured to process data in electronic form and includes stored executable instructions that perform the functions of method 200.

Method 200 will be described from the perspective of FIG. 1, where the system 100 of the computerized service environment interacts with the remote computerized system 170 of the protected domain environment via computerized network 160. However, method 200 is performed by data residency protection logic 110 of server computer 105 of the system 100 of FIG. 1 within the computerized service environment.

Upon initiating method 200, at block 210, user interface commands are received from a remote computerized system of a protected domain environment at a computerized service environment via computerized network communications. For example, in one embodiment, configuration commands are received by data residency protection logic 110 on the server computer 105 from the remote computerized system 170 of the protected domain environment via the computerized network 160 (e.g., a WAN or the internet). Visual user interface logic 120 of data residency protection logic 110 provides a graphical user interface for a user (e.g., a system administrator or integration specialist) of the remote computerized system 170 to interact with to provide the user interface commands.

At block 220, a data residency protection component is generated within the computerized service environment in response to the user interface commands. For example, in one embodiment, configuration logic 130 of data residency protection logic 110 on the server computer 105 generates the data residency protection component in response to the configuration commands. The data residency protection component is configured to act as a proxy for the computerized service environment. When executed in the protected domain environment by the remote computerized system 170, the data residency protection component isolates personally identifying information (PII) from visibility or storage outside of the protected domain environment (e.g., via substituting tokens).

Referring again to FIG. 2, as part of generating a data residency protection component at block 220, a check is performed to ensure that any newly generated data residency protection component does not counteract any data residency protections provided by other data residency protection components previously generated within the computerized service environment. For example, in one embodiment, the check is performed by configuration logic 130 of data residency protection logic 110 on the server computer 105.

Figure 3:
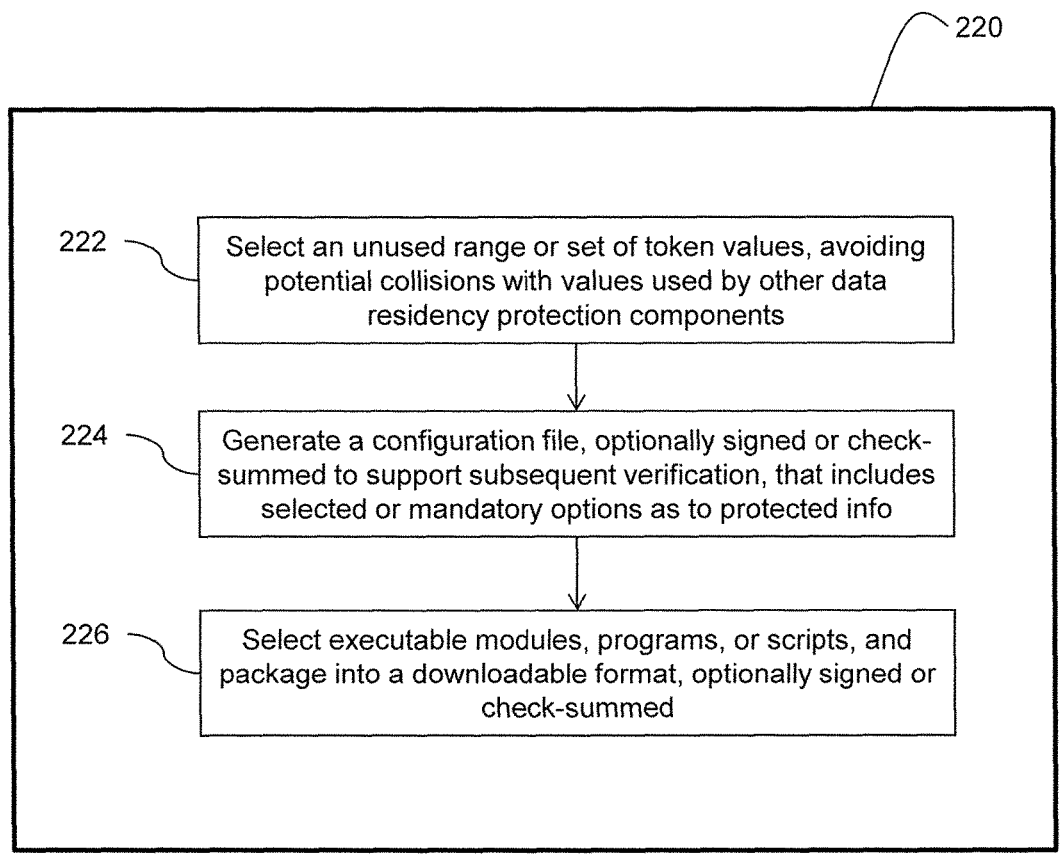
FIG. 3 illustrates one embodiment that expands on a portion of the method of FIG. 2.

FIG. 3 illustrates one embodiment that expands on block 220 of the method 200 of FIG. 2. Again, at block to 220, a data residency protection component is generated within the computerized service environment in response to user interface commands from, for example, an administrator of a remote computerized system in a protected domain environment. Referring to FIG. 3, at block 222 of block 220, an unused range or set of token values is selected and checked to avoid potential collisions with values used by other data residency protection components generated within the computerized service environment (i.e., to avoid counteracting data residency protection provided by the other data residency protection components).

At block 224 of block 220, a configuration file is generated that includes selected or mandatory options as to the information to be protected. The configuration file may be signed or check-summed to support subsequent verification. At block 226 of block 220, executable modules, programs, or scripts are selected and are packaged into a downloadable format. The packaged, downloadable format may be signed or check-summed to support subsequent verification.

Referring again to FIG. 1, data communications can occur between the computerized service environment and the protected domain environment when a user in the protected domain environment accesses and uses an application provided by the computerized service environment. In accordance with one embodiment, when executed by the remote computerized system 170, the data residency protection component monitors data communications from the protected domain environment to the computerized service environment for personally identifying information (PII). When personally identifying information (PII) is detected by the monitoring, the personally identifying information (PII) is replaced with token data to represent and protect the personally identifying information (PII). In this way, the personally identifying information (PII) does not leave the protected domain environment. Instead, the token data is communicated (e.g., transmitted) to the computerized service environment via the computerized network 160.

Similarly, in accordance with one embodiment, the data residency protection component monitors data communications from the computerized service environment to the protected domain environment for token data representing the personally identifying information (PII). When token data is detected by the monitoring, the token data is replaced with the associated personally identifying information (PII) within the protected domain environment. In this way, the personally identifying information (PII) is properly maintained as part of the overall data in the protected domain environment.

The other data residency protection components are stored in the database device 150. Therefore, the computerized service environment is knowledgeable of the other data residency protection components and their protection configurations. As a result, data residency protection logic 110 can access this knowledge and perform an analysis (a check) to make sure that a newly generated data residency protection component does not counteract any data residency protections provided by the other data residency protection components, and vice versa.

At block 230, once the data residency protection component is generated, it can be downloaded to the remote computerized system 170 of the protected domain environment from the computerized service environment via the computerized network 160. For example, in one embodiment, the downloading is performed by downloading logic 140 of data residency protection logic 110 on the server computer 105. Once downloaded, the data residency protection component can be installed, either automatically or manually, on the remote computerized system 170 in the protected domain environment.

In one embodiment, the system administrator associated with the protected domain environment, and having downloaded the files, can be prompted to accept the digital certificates and signatures based on the specific security settings of the receiving system. If the settings and executable files are accepted, either by the administrator or automatically based on the proof of origin provided by the digital signature, the files can then be loaded and installed in a manner specific to the operating system of the system in the protected domain environment that will be used to execute the data residency protection component. Alternatively, the executing system in the protected domain environment can be configured to download the appropriate files automatically for updates to the executable code or changes to the configuration required by the computerized service environment (e.g., if the regulations for which information are to be resident within the protected domain environment are changed). Also, if other languages or operating systems are used, there are comparable secure packaging formats suitable for distributing a digitally signed configuration and any executable programs, code, or files to be used.

Furthermore, changes in application configurations of the computerized service environment may occur over time, resulting in incompatibilities between the computerized service environment and a data residency protection component. At block 240, monitoring for changes in service (e.g., cloud) application configurations is performed. The monitoring is performed by configuration logic 130 of data residency protection logic 110 on the server computer 105 within the computerized service environment, in accordance with one embodiment. In accordance with another embodiment, the monitoring is performed by a different logic of the computerized service environment, which is separate from data residency protection logic 110. The different logic informs configuration logic 130 of any detected changes in service application configurations.

When service application configuration changes are detected, method 200 reverts back to block 220 to update the data residency protection component, if needed, to be compatible with the latest service application configurations. Again, in accordance with one embodiment, a copy of the data residency protection component is stored in the database device 150 in the computerized service environment and is, therefore, readily accessible for updating by configuration logic 130. The data residency protection component, as updated, may then be downloaded and installed on the remote computerized system 170 in the protected domain environment, thus replacing the previous version of the data residency protection component.

In accordance with one embodiment, the computerized service environment presents an administrator of the protected domain environment with configuration options (at block 210) as to which information should be protected. The decision is based on the regulations and laws of the protected jurisdiction. Some options may not be available based on decisions as to the minimum requirements for protected information in that jurisdiction.

In the case of a Java-based implementation, the computerized service environment can generate a configuration file detailing the options (at block 220), and digitally sign the configuration file using a public key certificate from a well-known or otherwise recognized certificate authority to prove that the configuration was valid when generated by the computerized service environment. Similarly, individual Java archives ("JAR files") can also be digitally signed to allow their origin to be verified by the administrator or by the system operating within the protected domain environment. A common file format known as Java Network Launch Protocol (JNLP) can be used to describe the network location from which the signed configuration and Java archive files can be downloaded, as well as other information relevant to the operation of the downloaded files. However, there are a number of similar or equivalent formats that can be used to describe such information in accordance with other embodiments.

When a system administrator from another protected jurisdiction accesses the computerized service environment, the process can be repeated, running from block 210 through block 230 of method 200. The configuration options presented may differ based on the specific requirements or regulations on protected information in that jurisdiction. The administrator can then download the digitally signed file or files, and proceed through verification, installation, and execution as described above herein. Updates may also be distributed in the manner described above.

The centralized system (e.g., system 100) in the computerized service environment has the responsibility for managing the values or ranges of values for the tokens to be used in each jurisdiction to support the function described in method 200. Additional security measures can be added and enforced, such as restricting which network addresses can access the computerized service environment, along with the data residency options presented to the system administrator.

In this way, the centralized system in the computerized service environment, when correctly administered and configured, can ensure that data residency options are correctly configured for all protected jurisdictions and that the origin of the data residency protection component can be verified using widely accepted public key cryptographic certificates techniques. Furthermore, the centralized system can ensure that any additional security measures such as network access restrictions based on system network address or range of addresses have been correctly applied by the remote system administrators. This significantly reduces the effort required to comply with data residency or similar requirements over multiple protected jurisdictions, reducing the effort required to update executable files or configuration files if changes are required by the centralized system. Furthermore, data received from these jurisdictions will not inadvertently corrupt the data held on the centralized system because of overlapping or duplicate token values or ranges.

In this manner, personally identifying information (PII) can be protected from leaving a protected domain environment while allowing users within the protected domain environment to access and use service applications provided by a computerized service environment which is located outside of the protected domain environment. Again, this avoids having to install and configure complex and customized hardware and/or software protection solutions within each protected domain environment. Furthermore, protection is maintained by the computerized service environment by supplying updated data residency protection components to protected domain environments as needed.

Systems, methods, and other embodiments have been described that are configured to protect personally identifying information. In one embodiment, a computerized service environment includes data residency protection logic configured to generate a data residency protection component within the computerized service environment in response to configuration commands received from a protected domain environment. The data residency protection component may be downloaded to the protected domain environment and, when executed within the protected domain environment, acts as a proxy for the computerized service environment to isolate personally identifying information from visibility outside of the protected domain environment.

Computing Device Embodiment

Figure 4:
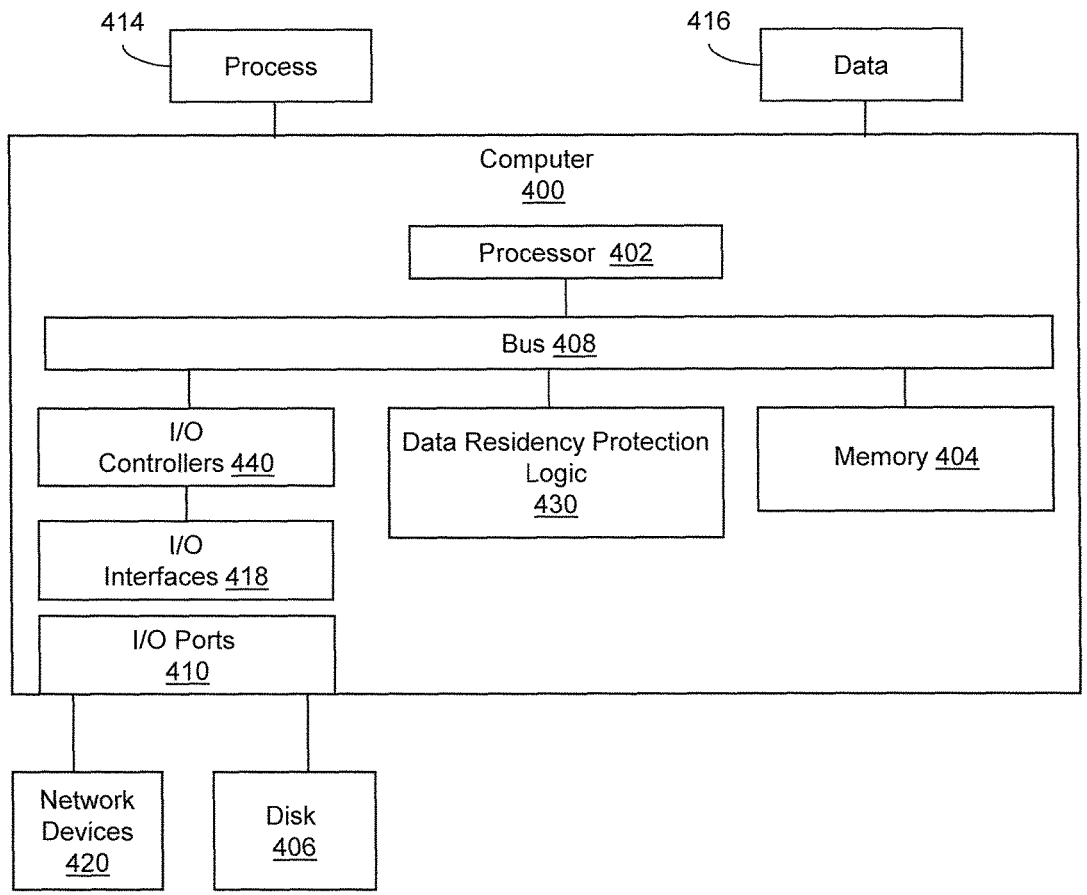
FIG. 4 illustrates one embodiment of a computing device upon which the data residency protection logic of FIG. 1 may be implemented.

FIG. 4 illustrates an example computing device that is configured and/or programmed with one or more of the example systems and methods described herein, and/or equivalents. FIG. 4 illustrates one example embodiment of a computing device upon which an embodiment of data residency protection logic may be implemented. The example computing device may be a computer 400 that includes a processor 402, a memory 404, and input/output ports 410 operably connected by a bus 408.

In one example, the computer 400 may include data residency protection logic 430 (e.g. corresponding to data residency protection logic 110 from FIG. 1). In different examples, logic 430 may be implemented in hardware, a non-transitory computer-readable medium with stored instructions, firmware, and/or combinations thereof. While logic 430 is illustrated as a hardware component attached to the bus 408, it is to be appreciated that in other embodiments, logic 430 could be implemented in the processor 402, a module stored in memory 404, or a module stored in disk 406.

In one embodiment, logic 430 or the computer 400 is a means (e.g., structure: hardware, non-transitory computer-readable medium, firmware) for performing the actions described. In some embodiments, the computing device may be configured as a server operating in a cloud computing system, a server configured in a Software as a Service (SaaS) architecture, a smart phone, laptop, tablet computing device, and so on.

The means may be implemented, for example, as an ASIC (application-specific integrated circuit) programmed to generate a data residency protection component within a computerized service environment in response to commands from a protected domain environment. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for receiving user interface commands from a remote computerized system of a protected domain environment at a computerized service environment via computerized network communications. Logic 430 may also provide means for generating a data residency protection component within the computerized service environment in response to the user interface commands.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.

HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device that includes at least one processor for executing instructions from a memory, the method comprising:

receiving, at a configuration module in a computerized service environment, user interface commands transmitted by a remote computerized system of a protected domain environment over a communication network, wherein the user interface commands comprise a configuration option that is indicative of a restriction to be imposed on access to personally identifying information within the protected domain environment;

with the configuration module, generating a data residency protection component within the computerized service environment in response to receiving the user interface commands, wherein the data residency protection component is configured according to the configuration option to, when executed in the protected domain environment by the remote computerized system:
  (i) act as a proxy that imposes the restriction on the access to the personally identifying information outside of the protected domain environment,
  (ii) monitor data communications from the protected domain environment to the computerized service environment for the personally identifying information;
  (iii) replace the personally identifying information with token data to represent and protect the personally identifying information, and
  (iv) transmit the token data to the computerized service environment via the communication network;
downloading the data residency protection component from the computerized service environment as an executable file to the remote computerized system of the protected domain environment via the communication network;
storing a record corresponding to the data residency protection component in a data residency database that is accessible to the computerized service environment, wherein the record identifies the restriction; and
with the configuration module, referencing the record in the database in response to subsequently receiving a second user interface command comprising a second configuration option, to avoid creating a second data residency protection component that counteracts the restriction of the data residency protection component.

2. The method of claim 1, wherein the data residency protection component is configured to, when executed in the protected domain environment by the remote computerized system, cause the remote computerized system to:
  monitor data communications from the computerized service environment to the protected domain environment for token data representing the personally identifying information; and
  replace the token data with the personally identifying information in the protected domain environment.

3. The method of claim 1, further comprising:
  with the configuration module of the computerized service environment, updating the data residency protection component in the computerized service environment in response to changes in service application configurations of the computerized service environment; and
  downloading the data residency protection component, as updated, to the protected domain environment via the communication network.

4. The method of claim 1, wherein the data residency protection component includes a Java executable component.

5. The method of claim 1, wherein the data residency protection component is configured to operate with a web-based protocol.

6. The method of claim 1, wherein the data residency protection component is configured to operate with a mail transfer protocol.

7. The method of claim 1, wherein the data residency protection component is configured to operate with a file transfer protocol.

8. The method of claim 1, wherein the data residency protection component is configured to be automatically installed on the remote computerized system in the protected domain environment upon being downloaded to the protected domain environment.

9. A computing system of a computerized service environment, comprising:
  a non-transitory computer-readable medium, storing instructions;
  a visual user interface module stored in the non-transitory computer readable medium including instructions that when executed cause a processor to generate a graphical user interface that can be accessed by a remote computerized system of a protected domain environment over a communication network;
  a configuration module stored in the non-transitory computer readable medium including instructions that when executed cause the processor to: (i) generate a data residency protection component within the computerized service environment in accordance with a configuration option received as part of configuration commands from the remote computerized system of the protected domain environment via the communication network, as facilitated by the graphical user interface, wherein the configuration option indicates a restriction to be imposed on external access to personally identifying information stored in the protected domain environment, (ii) store a record corresponding to the data residency protection component in a database that is accessible to the computerized service environment, wherein the record identifies the restriction, and (iii) reference the record in the database when creating a second data residency protection component to avoid counteracting the data residency protection component; and
  a downloading module stored in the non-transitory computer readable medium including instructions that when executed cause the processor to download the data residency protection component as an executable file to the remote computerized system of the protected domain environment from the computerized service environment via the communication network in response to a download command received from the remote computerized system of the protected domain environment via the communication network, as facilitated by the graphical user interface,
  wherein the data residency protection component is configured according to the configuration option to, when executed in the protected domain environment by the remote computerized system:
    (i) act as a proxy that interferes with viewing of the personally identifying information outside of the protected domain environment,
    (ii) monitor data communications from the protected domain environment to the computerized service environment for the personally identifying information;
    (iii) replace the personally identifying information with token data to represent and protect the personally identifying information, and
    (iv) transmit the token data to the computerized service environment via the communication network.

10. The computing system of claim 9, wherein the computing system of the computerized service environment includes a server computer.

11. The computing system of claim 9, wherein the visual user interface module stored in the non-transitory computer readable medium includes instructions that when executed cause the processor to provide a selectable option via the graphical user interface for the data residency protection component to be automatically installed on the remote computerized system of the protected domain environment upon being downloaded by the downloading module.

12. The computing system of claim 9:
    wherein the configuration module stored in the non-transitory computer readable medium includes instructions that when executed cause the processor to update the data residency protection component in the computerized service environment in response to changes in service application configurations of the computerized service environment; and
    wherein the downloading module stored in the non-transitory computer readable medium includes instructions that when executed cause the processor to download the data residency protection component, as updated, to the protected domain environment via the computerized network communications.

13. The computing system of claim 9, wherein the configuration module stored in the non-transitory computer readable medium includes instructions that when executed cause the processor to generate the data residency protection component within the computerized service environment as a Java executable component.

14. The computing system of claim 9, wherein the configuration module stored in the non-transitory computer readable medium includes instructions that when executed cause the processor to generate the data residency protection component within the computerized service environment to be compatible with one of a web-based protocol, a mail transfer protocol, or a file transfer protocol.

15. A non-transitory computer-readable medium storing instructions that, when executed by one or more processors of a computing device in a computerized service environment, cause the computing device to at least:
    receive, within the computerized service environment over a communication network, user interface commands from a remote computerized system of a protected domain environment, wherein the user interface commands comprise a configuration option that is indicative of a restriction to be imposed on access to personally identifying information within the protected domain environment;
    generate a data residency protection component within the computerized service environment in response to receiving the user interface commands;
    store a record corresponding to the data residency protection component in a data residency database that is accessible to the computerized service environment, wherein the record identifies the restriction and acts as a reference for interfering with creation of a second data residency protection component that counteracts the restriction of the data residency protection component; and
    download the data residency protection component to the remote computerized system of the protected domain environment from the computerized service environment via the computerized network communications,
    wherein the data residency protection component is configured according to the configuration option to, when executed in the protected domain environment by the remote computerized system
        (i) act as a proxy that imposes the restriction on the access to the personally identifying information outside of the protected domain environment,
        (ii) monitor data communications from the protected domain environment to the computerized service environment for the personally identifying information;
        (iii) replace the personally identifying information with token data to represent and protect the personally identifying information, and
        (iv) transmit the token data to the computerized service environment via the communication network.

16. The non-transitory computer-readable medium of claim 15, wherein the instructions further comprise instructions that, when executed by the one or more processors, cause the computing device to at least:
    update the data residency protection component in the computerized service environment, via the one or more processors, in response to changes in service application configurations of the computerized service environment; and
    download the data residency protection component, as updated, to the protected domain environment via the computerized network communications.

* * * * *

UNITED STATES PATENT AND TRADEMARK OFFICE
CERTIFICATE OF CORRECTION

PATENT NO. : 10,176,341 B2  
APPLICATION NO. : 15/073700  
DATED : January 8, 2019  
INVENTOR(S) : Spaulding et al.

Page 1 of 1

It is certified that error appears in the above-identified patent and that said Letters Patent is hereby corrected as shown below:

On the Title Page

Column 2, under Other Publications, Line 1, delete "Yueiqiang" and insert -- Yueqiang --, therefor.

Signed and Sealed this  
Seventh Day of January, 2020

Andrei Iancu  
*Director of the United States Patent and Trademark Office*